United States Patent
Mead et al.

(10) Patent No.: US 7,035,634 B2
(45) Date of Patent: Apr. 25, 2006

(54) IN-FLIGHT E-MAIL SYSTEM

(75) Inventors: Stephen E. Mead, Peoria, AZ (US); David C. Hosford, Phoenix, AZ (US)

(73) Assignee: Honeywell International Inc., Morristown, NJ (US)

(*) Notice: Subject to any disclaimer, the term of this patent is extended or adjusted under 35 U.S.C. 154(b) by 516 days.

(21) Appl. No.: 09/829,887

(22) Filed: Apr. 10, 2001

(65) Prior Publication Data
US 2001/0036822 A1  Nov. 1, 2001

Related U.S. Application Data

(60) Provisional application No. 60/195,771, filed on Apr. 10, 2000.

(51) Int. Cl.
*H04Q 7/20* (2006.01)

(52) U.S. Cl. .................. 455/431; 455/412.1; 709/206

(58) Field of Classification Search ............... 455/431, 455/412.1, 414.1, 414.3, 422.1, 466; 709/206, 709/207, 212
See application file for complete search history.

(56) References Cited

U.S. PATENT DOCUMENTS

| | | | | |
|---|---|---|---|---|
| 6,047,165 A | | 4/2000 | Wright et al. ............... 455/66.1 |
| 6,173,159 B1 * | | 1/2001 | Wright et al. ............... 455/66.1 |
| 6,201,797 B1 | | 3/2001 | Leuca et al. .................. 370/316 |
| 6,205,471 B1 * | | 3/2001 | Gilchrist et al. ............. 709/206 |
| 6,249,913 B1 | | 6/2001 | Galipeau et al. .............. 725/76 |
| 6,438,468 B1 | | 8/2002 | Muxlow et al. ................ 701/3 |
| 6,477,152 B1 | | 11/2002 | Hiett ........................... 370/316 |
| 6,499,027 B1 | | 12/2002 | Weinberger ..................... 707/4 |
| 6,757,712 B1 * | | 6/2004 | Bastian et al. ............... 709/206 |
| 6,760,757 B1 * | | 7/2004 | Lundberg et al. ............ 709/217 |
| 6,795,408 B1 | | 9/2004 | Hiett ........................... 370/323 |
| 6,816,728 B1 | | 11/2004 | Igloi et al. ................... 455/431 |
| 2003/0043811 A1 * | | 3/2003 | Leuca et al. .............. 370/395.2 |

FOREIGN PATENT DOCUMENTS

| | | |
|---|---|---|
| EP | 0 890 907 A1 | 7/1997 |
| EP | 1096699 A2 * | 5/2001 |
| GB | 2347586 A * | 9/2000 |
| JP | 02-012551 | 1/1990 |
| WO | WO 00 14987 A | 3/2000 |

OTHER PUBLICATIONS

Jameel A et al; "Internet Multimedia On Wheels: Connecting Cars to Cyberspace"; Intelligent Transportation System, 1997 ITSC '97; IEEE Conference on Boston, MA; Nov. 9-12, 1997, New York, NY.

Kylanpaa M et al; "Nomadic Access to Information Services by a GSM Phone"; Computers and Graphics, Pergamon (Continued)

*Primary Examiner*—Ovidio Escalante
(74) *Attorney, Agent, or Firm*—Andrew A. Abeyta

(57) ABSTRACT

Systems and methods for sending and receiving e-mail from a terminal on a vehicle are provided. According to one embodiment, a passenger in a vehicle, such as an airplane, has access to a terminal and can send and receive e-mail messages between the terminal and a first server located on the vehicle. The first server wirelessly communicates e-mail messages with a second server external to the vehicle. The second server is configured to send and receive e-mail messages between the second server and a data network.

54 Claims, 5 Drawing Sheets

OTHER PUBLICATIONS

Press Ltd., Oxford, GB, vol. 20, No. 5; Sep. 1, 1996; pp. 651-658.

PCT International Search Report; Apr. 10, 2000 Priority Date; Apr. 10, 2001 International Filing Date; PCT/US01/11799.

ARINC, "Network Server System," ARINC Characteristic 763-1, Dec. 15, 2000.

U.S. Appl. No. 09/475,337, filed Dec. 30, 1999, Hiett, John H., "Networking System for Mobile Data Communications".

* cited by examiner

IN-FLIGHT E-MAIL SYSTEM

CROSS REFERENCE TO RELATED APPLICATION

This Application claims the benefit of, and priority to, provisional application Ser. No. 60/195,771, filed Apr. 10, 2000, which is hereby incorporated by reference in its entirety.

FIELD OF THE INVENTION

The present invention relates to electronic mail systems. More specifically, the present invention relates to methods and systems for delivering electronic mail between users in a vehicle and others outside of the vehicle.

BACKGROUND OF THE INVENTION

In recent years, electronic mail ("e-mail") has become a prevalent form of communication. Because e-mail is typically fast, convenient, and easy to use, e-mail has become a popular media for communications in both business and personal settings. In particular, travelers often use e-mail when they are away from their home or office to keep in touch with family, friends, or business associates. A number of techniques for obtaining e-mail even when a traveler is away from the home or office are known in the prior art. For example, various telephone or other data connections allow e-mail users to "dial up" a remote e-mail server to send and receive messages, as appropriate. Sophisticated internet service providers ("ISPs") often provide local dial up numbers for users traveling to remote locations. Although such numbers are convenient, they are often unavailable while a traveler is on an airplane, boat, train, bus, car, or other vehicle. When a traveler is on a long airplane flight (while traveling across the continent or across an ocean for example), he or she may be away from his or her e-mail for a prolonged period of time.

Telephone connections from airplanes to the ground have been available for some time. Such connections have been used to place modem connections from, for example, notebook computers carried by passengers on the aircraft to remote servers for data connections such as e-mail, network access, and the like. Phone connections presently available on aircraft and other vehicles, however, typically exhibit a number of marked disadvantages. First, such connections are frequently expensive because they require dedicated channels on satellites or other very expensive communications channels. Moreover, phone connections currently available from airplanes are subject to the noise and connection loss problems associated with wireless communications and phone connections may be cumbersome for most notebook computer users because the configurations and other technical requirements may be non-intuitive or unavailable to most users. Additionally, the bandwidth provided by most telecommunications links from aircraft is frequently very low, e.g., on the order of 2,400 bits per second. Such slow data transfer rates are often unsuitable for many applications, including web surfing and e-mail exchange. It is therefore desirable to create an e-mail system that allows users to send and receive data (such as e-mail) while traveling on a vehicle such as an aircraft, without the expense, configuration overhead, and bandwidth restrictions imposed by systems available in the prior art.

SUMMARY OF THE INVENTION

Systems and methods for sending and receiving e-mail from a terminal on a vehicle are provided. According to one embodiment, a passenger in a vehicle, such as an airplane, has access to a terminal and can send and receive e-mail messages between the terminal and a first server located on the vehicle. The first server wirelessly communicates e-mail messages with a second server external to the vehicle. The second server is configured to send and receive e-mail messages between the second server and a data network.

BRIEF DESCRIPTION OF THE DRAWING FIGURES

The above and other features and advantages of the present invention are hereinafter described in the following detailed description of illustrative embodiments to be read in conjunction with the accompanying drawing figures, wherein like reference numerals are used to identify the same or similar parts in the similar views, and:

DETAILED DESCRIPTION OF EXEMPLARY EMBODIMENTS

The present invention may be described herein in terms of functional block components and various processing steps. It should be appreciated that such functional blocks may be realized by any number of hardware and/or software components or computer systems configured to perform the specified functions. For example, the present invention may employ various computer systems, e.g., personal computers, workstations, routers, gateways, and the like, which may carry out a variety of functions under the control of one or more microprocessors or other control devices. Similarly, the software elements of the present invention may be implemented with any programming or scripting languages such as C, C++, Java, Assembly Language, PERL, or the like, or any combination thereof, with the various algorithms being implemented with any combination of data structures, objects, processes, routines or other programming elements. Further, it should be noted that the present invention may employ any number of techniques for data transmission, signaling, data processing, network control, and the like.

It should be appreciated that the particular implementations shown and described herein are illustrative of exemplary embodiments, the invention, and are not intended to limit the scope of the invention in any way. Indeed, for the sake of brevity, conventional data networking, application development and other functional aspects of the systems (and components of the individual operating components of the systems) may not be described in detail. Furthermore, the connecting lines shown in the various figures contained herein are intended to represent exemplary functional relationships and/or physical or logical couplings between the various elements. It should be noted that many alternative or additional functional relationships, physical connections or logical connections may be present in a practical electronic mail system.

To simplify the description of the exemplary embodiments, the invention is frequently described as pertaining to an electronic mail system for an aircraft. It will be appreciated, however, that many applications of the present invention could be formulated. For example, the present invention could be used on any sort of vehicle such as an airplane, helicopter, aircraft of any sort, boat, ship, bus, train, or automobile. Similarly, the architecture and techniques described in the present invention may be useful for applications other than e-mail. The dual server architecture could be used to implement, for example, web browsing, application serving, or any other purpose. Further, although the invention is frequently described herein as being implemented with TCP/IP communications protocols, it will be readily understood that the invention could also be implemented using IPX, Appletalk, IP6, NETBIOS, OSI, or any number of existing or future protocols.

Figure 1:
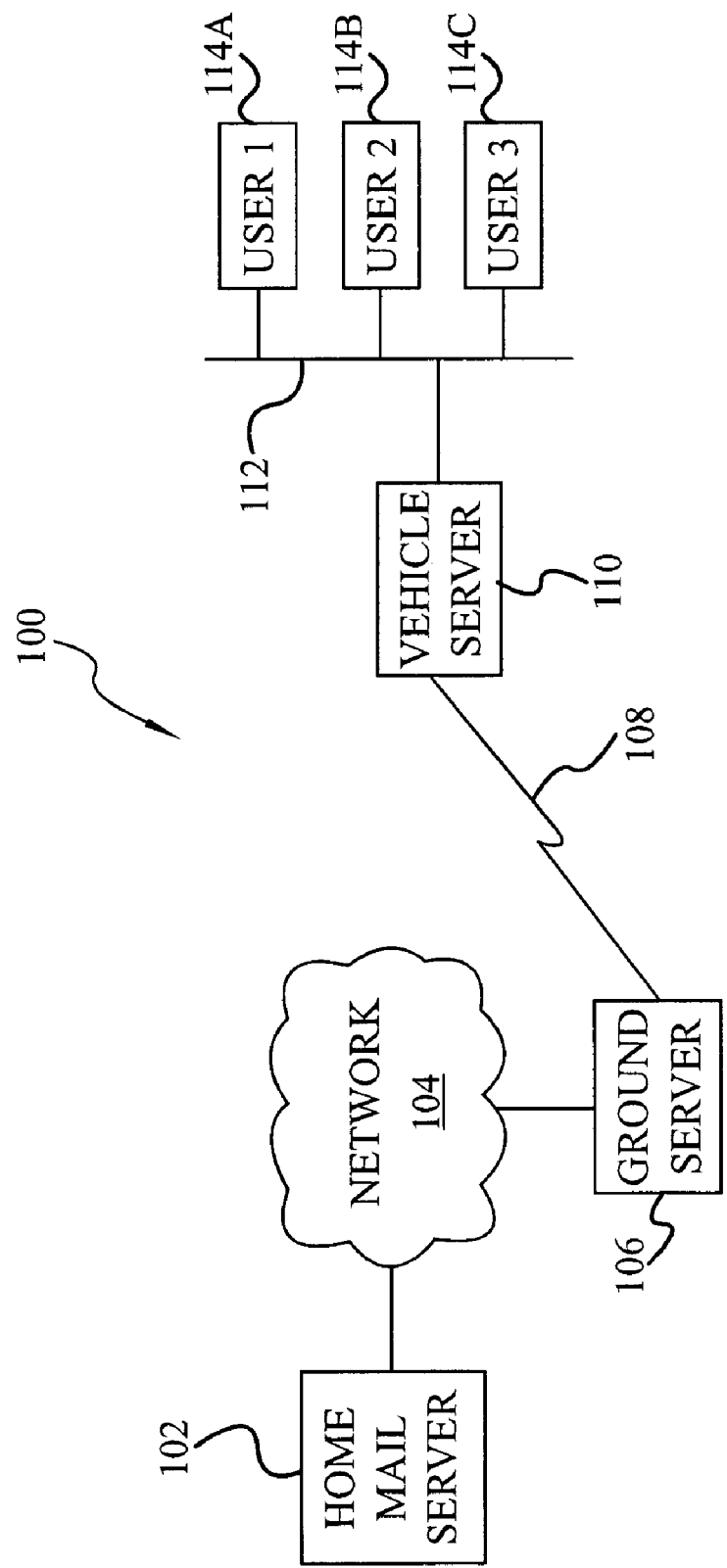
FIG. 1 is a block diagram of an exemplary e-mail system.

FIG. 1 is a block diagram of an exemplary electronic mail system suitable for use with a vehicle such as an aircraft. With reference to FIG. 1, an e-mail system 100 suitably includes a ground server 106 communicating with a vehicle server 110 that is located on a vehicle such as an aircraft. Although the vehicle server 110 is described as being located on a vehicle, it is understood that the vehicle server is associated with the vehicle in such a way that it moves with the vehicle. For example, the vehicle server and other devices on the vehicle, or portions of thereof, can be located either on the interior or the exterior of the vehicle. Users 114 (shown as User1 114A, User2 114B and User3 114C in FIG. 1) suitably send and receive e-mail by communicating with vehicle server 110, which communicates with ground server 106 via a communications link 108. Ground server 106 relays electronic mail messages between vehicle server 110 and a data network 104, such as the Internet. If User 114 has a home e-mail server 102 (such as an ISP account or a corporate e-mail account) ground server 106 may receive e-mail from the home mail server 102, via network 104. Vehicle server 110 may not necessarily remain in constant communication with ground server 106, but may rather establish data link 108 intermittently as appropriate and as described more fully below. In determining how to connect to ground server 106, vehicle server 110 may consider selection criteria such as: the amount of data required to be transmitted, the urgency of the data, geographic location, data type, and other factors as appropriate. These and similar selection criteria suitably assist in selecting an appropriate communication mode from among the various options discussed herein. When data connection, 108 is established by vehicle server 110, the type and duration of the connection may be selected so as to minimize the total cost of the connection, or to maximize the total data throughput of system 100, as described more fully below.

Figure 2:
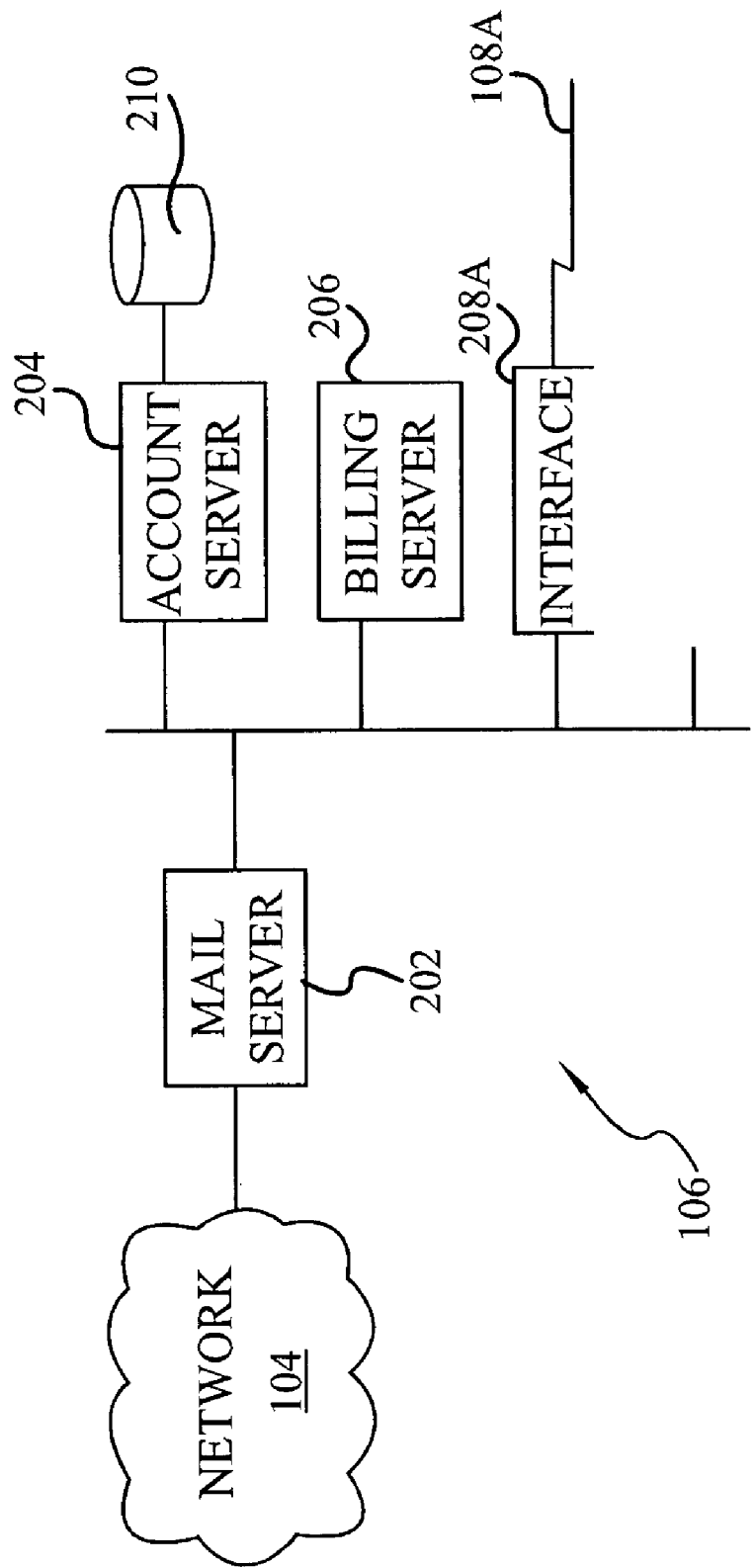
FIG. 2 is a block diagram of an exemplary ground based server.

FIG. 2 is a block diagram of an exemplary ground server 106. Although server 106 is often referred to herein as a "ground" server, it should be noted that this is simply a term of convenience, and that ground server 106 may be located on the ground, in the air, on a satellite, or in any other location external to the vehicle. With reference to FIG. 2, an exemplary ground server 106 suitably includes a mail server 202 in connection with network 104, an account server 204, a billing server 206, and one or more interfaces 208 to data connection 108. Network 104 is any sort of data communications network such as the Internet, the Public Switch Telephone Network (PSTN), a corporate network, an intranet and extranet, a private data network or any other sort of data network. Mail server 202 is a computer system such as a UNIX workstation, mainframe, minicomputer, personal computer, or the like that is capable of exchanging electronic mail with other mail servers on network 104. For example, mail server 202 may be a computer or workstation running the UNIX, LENIX or Windows NT operating system with daemons, processes, applications or other mechanisms supporting the Simply Mail Transport Protocol (SMTP) as described in Internet Request for Comments (RFC) 821, the Post Office Protocol (POP3) described in RFCs 1081 and 1082, and the Internet Mail Application Protocol (IMAP4) described by RFC 1064 (all of the aforementioned RFCs are incorporated herein by reference). Mail server 202 suitably exchanges electronic mail with other mail servers on network 104 as appropriate and as described herein. For example, mail server 202 may transmit and receive e-mails with other SMTP servers on a TCP/IP based network such as the Internet. Mail server 202 suitably communicates with an account server 204, a billing server 206, and various data communications interfaces 208. It will be appreciated that the logical functionalities shown in FIG. 2 may be combined onto various computer systems in any way. For example, a single computer could support account server 204 and billing server 206 in various embodiments. Alternatively, clusters of computers could be used to create backups, redundancy, load sharing, or firewalling in some or any of the functionality's shown in FIG. 2.

Various embodiments of mail server 202 suitably include an e-mail storage database, a collection of user e-mail accounts, and/or virus/spam detection and elimination processing, for example. An e-mail storage database associated with mail server 202 may be configured to store messages for various system users that have been retrieved from the users' home systems via network 104, from remote vehicle servers 110 (FIG. 1), from e-mail clients on system 104, or from any other source. In such embodiments, accounts on ground server 106 suitably store messages for a particular user that may be retrieved via network 104 or via one or more vehicle servers 110, as described more fully below.

Account server 204 suitably communicates with a database 210 to maintain information about system users. Information that may be maintained in database 210 includes payment information (such as credit card information including credit card numbers and expiration dates), e-mail account information (such as mail server addresses, account names and the like), billing information, address information, and the like. Billing server 206 suitably maintains billing records for each of the users 114 of the system.

Interfaces 208A and 208B (as well as any additional interfaces 208) suitably transport data between ground server 106 and a datalink 108 (FIG. 1). Interfaces 208 include, but are not limited to communications devices described herein. Exemplary data interfaces include interfaces to ground satellite units, Gatelink units, and the like, as described more fully below. E-mail for the various users 114 may be received at mail server 202 from network 104 in any manner. For example, a user 114 may configure his or her home e-mail server 102 (FIG. 1) to forward e-mail messages received to an appropriate account at mail server 202. Alternatively, mail server 202 may periodically poll home mail server 102 to obtain e-mail messages, using, for example, the POP3 protocol. If home mail server 102 is concealed from network 104 by a firewall (not shown), POP3 queries from mail server 202 to home mail server 102 may be obscured. In such cases, access to the home mail server 102 may be provided through a conventional virtual private network (VPN) or by allowing communications from mail server 202 to home mail server 102 to pass through the firewall, (for example by editing router access controls on the POP3 port between the two servers). In any case, mail is provided to mail server 202 through retrieval by server 202 or forwarding from home mail server 102, or by any other suitable technique.

Figure 3:
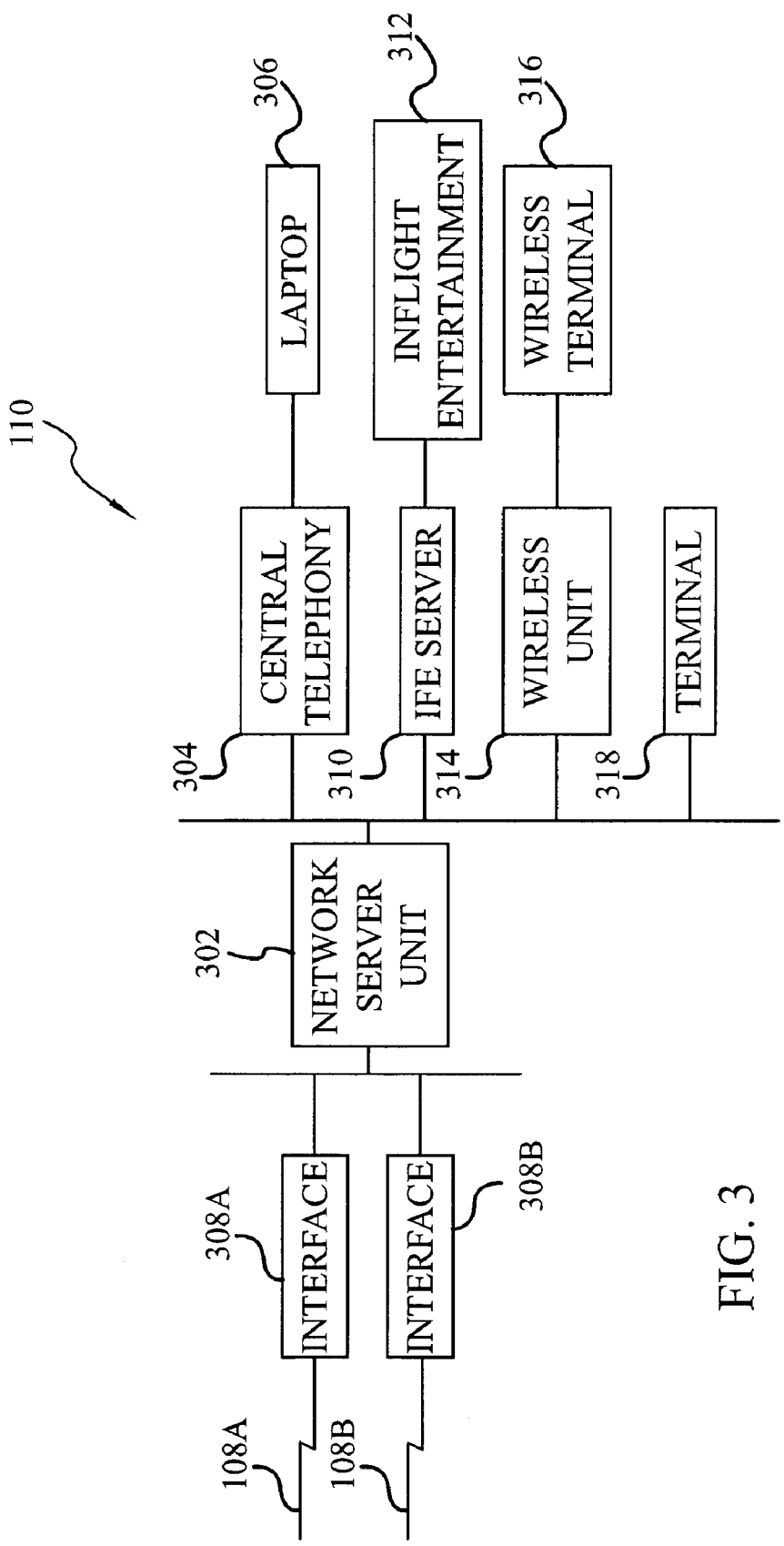
FIG. 3 is a block diagram of an exemplary vehicle based server.

FIG. 3 is a block diagram of an exemplary vehicle server 110. With reference now to FIG. 3, an exemplary vehicle server 110 suitably includes a network server unit 302, one or more interfaces 308 to data link 108, and one or more other interfaces to user 114. User 114 suitably interfaces to vehicle server 110 through any sort of terminal such as a notebook computer, personal digital assistant, kiosk, In-flight entertainment system, wireless terminal, direct connection terminal, or any other device. Users 114 with laptop computers 306 may suitably connect to network server unit 302 via a central telephony unit 304 which may in turn communicate with a modem interface unit (not shown) to exchange data between passenger laptop 306 and network server 302. Other options for connecting to network server 302 include connecting via an in-flight entertainment system (IFE) 312 (such as an IFE presently found on many aircraft) via an in-flight entertainment system 310. Alternatively, a wireless terminal (such as a mobile terminal based upon any operating system, such as the Windows operating system, available from the Microsoft Corporation of Redmond, Wash., or Palm operating system available from Palm, Inc., Santa Clara, Calif.) may be provided to users 114. Wireless terminals 316 may connect to network server 302 via wireless interface unit 314 (such as an 802.11-compliant Cabin Wireless LAN Unit communicating with laptop 306 or a handout device via a PCMCIA WLAN card, a Modem/WLAN bridge, or a Ethernet/WLAN bridge). Alternatively, and in various embodiments, users may connect to network server unit 302 via a direct connect terminal 318, which may be a kiosk or other data access point on vehicle. Of course other techniques and mechanisms for connecting to network server 302 could be formulated in various embodiments of the invention. In an exemplary embodiment, a user 114 with a laptop computer 306 suitably plugs the modem port of the laptop 306 into a data jack (such as an RJ11 or RJ14 data jack) commonly found on many aircraft in conjunction with in-flight telephone services. The data jacks associated with the in-flight telephone services may be coupled to the central telephony unit 304, which in turn may be coupled to a modem interface unit (not shown) that is capable of translating the modem signal tones generated by the modem in passenger laptop 306. The modem interface unit may then act as a translator in providing data from passenger laptop 306 to network server unit 302. After the laptop computer 306 is connected to the data jack, a user may instruct the modem to dial a phone number, which may be provided by aircraft personnel, by the in-flight entertainment system, or by any other information providing source. The phone number may be interpreted by the CTU 304 as directing the data connection to modem interface unit which in turn will connect the laptop to network server unit 302. Network server 302 may be a conventional network server unit such as a server in compliance with ARINC Standard 763 (dated December, 1999 and incorporated herein by reference) such as those available from, for example, Honeywell Inc. of Phoenix, Ariz., or from any other source.

A user with a laptop or other terminal can, in one embodiment, connect to network server unit 302 without modifying or adding to the user's e-mail client software. Connection without modification of software can be made possible in one embodiment by configuring a Domain Name System server application on network server unit 302. For example, an Address record could be configured with a wild-card ("*") to cover any possible passenger laptop Domain Name configuration. This record can suitably redirect communications to SMTP and POP3 proxy server applications on network server unit 302.

Network server unit 302 may act as a world wide web server, for example, and may serve a web page to an internet client on laptop 306 such as Netscape Communicator (available from the Netscape Corporation of Mountainview, Calif.) or Internet Explorer (available from the Microsoft Corporation of Redmond, Wash.). In such embodiments, network server unit 302 may provide a web based e-mail client to laptop 306 that is easily operable by user 114 without requiring any software additions or modifications on laptop 306. Alternatively, (or in addition), network server unit 302 may emulate a mail server such as the mail server to which laptop 306 is configured to receive e-mail. For example, if laptop 306 has an e-mail client that is configured to receive e-mail from "ISP Mail.com" using a specified user ID and password, network server unit 302 may capture the request for a connection from laptop 306, and may respond to the request with an affirmative response, effectively emulating the mail server at ISP mail. com, from the viewpoint of the user's mail client.

Network server unit 302 may also contain processing functionality for establishing a connection 108 with ground server 106 in such a manner as to minimize the cost of the connection. For example, network server unit 302 may queue outgoing e-mail messages from various users, until a specified amount of data has been received or until specified period of time has elapsed. As discussed more fully below, various connection techniques are available, and each connection technique has varying parameters in terms of cost geographic location, message type, and bandwidth availability. Network server unit 302 may provide an optimization algorithm such that mail is transferred on a need basis, to reduce cost, or on any other basis. Commercial e-mail protocols are not typically designed for wireless communications because, for example, they are typically less secure, and typically have smaller bandwidth. In various embodiments, network server 302 may suitably overcome these weaknesses by compressing and/or encrypting data prior to transfer. Suitable compression algorithms include LZW, LZ-78 and the like. Suitable encryption algorithms include DES, RSA, and the like.

Various techniques or communication modes for transporting data between vehicle server 110 and ground server 106 and vice versa include Gatelink Data Communications (such as IEEE 802.11-based 2.4 GHz Gatelink system available from Honeywell Inc. of Phoenix, Ariz.), satellite communications, UHF/VHF communications to ground-based antennas connected to the North American Telephony Standard (NATS) network, and others. The Gatelink system is a wireless data communication system available at several airports worldwide. The system includes the capability to transfer data rapidly and at relatively low cost via a wireless link, but typically only when the vehicle is within a relatively close proximity to a base receiving station (e.g., an aircraft terminal). In many conventional implementations of the Gatelink system, an aircraft should be within 1,000 or so meters of a terminal gate to successfully transfer data.

Communications via a satellite data unit suitably transfer data from the vehicle to one or more satellites, such as those satellites in geo-synchronous orbit provided by, for example, the Inmarsat Corporation of the United Kingdom. At least two modes of communication are available via satellite, including the "Data 3" mode, which is a packet mode data delivery mode providing approximately 1,000 bits of data for a fixed cost (e.g., approximately twenty-nine cents) and with "circuit mode", which is a connection-based transport mode typically used for voice connections. Circuit mode connections may be charged a connection fee (presently on the order of $3.00 per connection) plus a "per minute" fee presently on the order of $4.50 per minute (relegating its cost effectiveness to bulk data communications). Circuit mode SDU communications are typically limited in bandwidth to approximately 2,400 bits per second.

The North American Telephone System is a radio based system that may be connected to a central telephone unit (CTU) on the aircraft, which talks to one or more ground stations located throughout the continent. Although the NATS system provides improved bandwidth as compared to the SDU communications (e.g., on the order of 4,800 bits per second) connections are still typically relatively expensive (e.g., on the order of $3.00 per connection plus $2.00 per minute). NATS communications are not typically available outside of North America or over the oceans. The SDU communication systems also provide a CN50 mode which is a broadcast only mode (e.g., aircraft can only receive CN50 data, and cannot transmit CN50 data). Although CN50 broadcasts are less expensive than traditional NATS or SDU communications, bandwidth is limited to approximately 2,000 bits per second. As can be readily appreciated, each of the communication modes currently available between aircraft and the ground are expensive and slow. Various embodiments, however, optimize the various forms of communication available to server 302 to combine data communications between users, where appropriate, or to otherwise reduce the total cost of the overall e-mail system 100. These economies of scale can be passed on to the individual users, who may be charged a lesser amount than if they were to create a direct SDU or NATS circuit mode connection to their home mail server 102.

User 114, in one embodiment, suitably signs up for an account on e-mail system 100. This sign-up process may suitably occur after initial connection, to network server unit 302. However, sign-up could take place through other electronic connections, or through off-line modes such as registering via paper mail. In various embodiments, e-mail system 100 prevents user 114 from working "on-line" other than signing up for an account until user 114 has signed up and completes a e-mail system login/authentication process.

Figure 4:
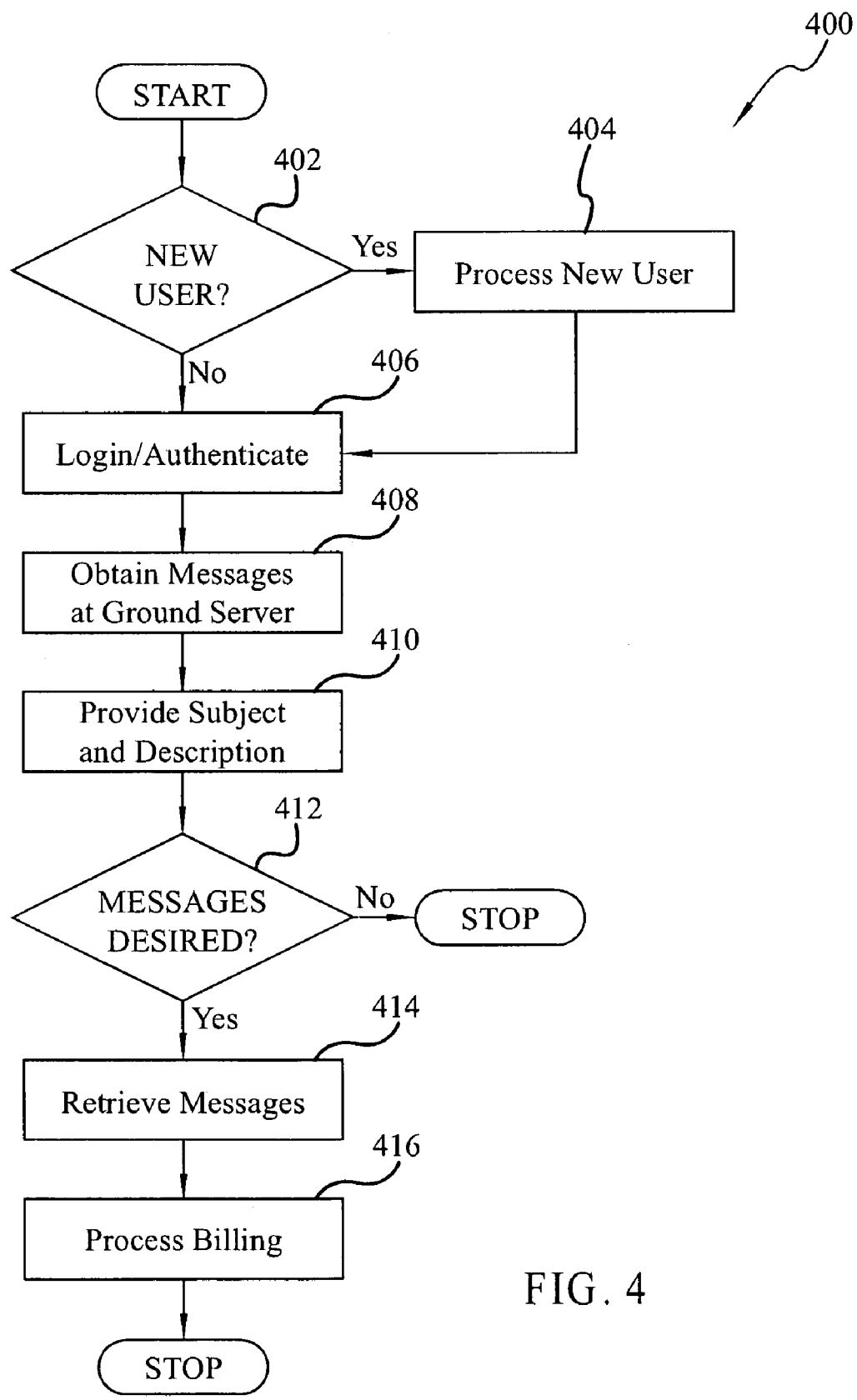
FIG. 4 is a flowchart of an exemplary process for retrieving e-mails.

FIG. 4 is a flowchart of an exemplary process 400 for retrieving e-mail. With reference now to FIG. 4, an exemplary process 400 suitably begins with a user 114 connecting to network server unit 302 and logging in/authenticating with the system 100 (step 406). If the user is not registered with system 100, user 114 may be prompted to enter billing information (such as credit card numbers and expiration dates) as well as user ID account information, and information about the users home mail server 102, as appropriate (steps 402, 404). Steps 402, 404, and 406 may be processed using an e-mail message system, or through an HTML/Web interface, or through another interface. During the authentication process 406, network server unit 302 may establish a connection to account server 204 which may verify user 114's account in database 210. If the user is authenticated or otherwise permitted to use the system, account server 204 may send a return packet to network server unit 302, and the transaction may proceed. User 114 authentication, in various embodiments may satisfy authentication purposes both for working on e-mail system 100, and for accessing home e-mail accounts. In other embodiments, separate authentication steps may be required and may take place at different times and may be performed multiple times as appropriate. However, in other embodiments, user 114 does not have to take authentication steps more than one time per session if multiple messages are received and sent in one session.

Headers and/or e-mail messages for user 114 may then be retrieved from that user's account on server 202 in various embodiments. E-mail messages are obtained via mail server 202 from user 114's home mail server 102, as described above (step 408). In various exemplary embodiments, initially header information such as "from", "subject", date sent, and other information as appropriate may be retrieved from each message on server 202 and provided to user 114 as appropriate (step 410). This header/summary information may be provided in the form of an e-mail or HTML offer allowing user 114 to selectively chose e-mail messages for transmission from mail server 200 to network server 302 and thus to user 114. This offer suitably allows user 114 to determine whether he or she wishes to read each individual message before paying the cost to transport the message across data link 108. It may also allow the user to avoid transfer costs for "SPAM" or other unwanted e-mails. In an exemplary embodiment, server 202 suitably formats an e-mail message with summary information about the messages stored in the user's account. The summary message may be in ASCII, HTML, or any other format, and may be a "reply" message to a previous "offer"/summary message.

In various embodiments, network server unit 302 prompts user 114 to indicate which inbox e-mail messages headers are to be offered to user 114. For example, all in-box messages could be selected for offer to user 114. Alternatively, only new in-box messages, messages within a limited number of days, and/or messages with high priority could be selected. Similarly, other e-mail identifying information could be used to limit the number of headers offered to user 114. Furthermore, user 114, in various embodiments, may request that mail server 200 periodically poll home e-mail server 102.

Preferences regarding the selection criteria for retrieving in-box messages can be entered through web based applications, via e-mail client applications, or similar methods. E-mail client applications are applications such as Outlook, Outlook Express, Eudora, cc:mail, Lotus Notes, and Pegasus. In an e-mail client application, server 302 suitably sends e-mail messages to user 114 welcoming user 114, providing help options to user 114, and providing options such as those discussed above for selecting in-box headers to be offered. By replying to an e-mail containing a desired option, user 114 indicates which services are desired and server 302 carries out those instructions. For example, if reply is made to an e-mail message requesting periodic polling of the user's new messages, first an e-mail may be suitably provided to user 114—a reply to which allows user 114 to turn off the periodic polling. Second, e-mail at user's home e-mail server is periodically copied to server 200 and new e-mail is offered to user 114. In a web based application, similar information can be requested from user 114.

In an exemplary embodiment of an e-mail client application, each offered e-mail message is in itself an e-mail message which can be selected for viewing by replying to that e-mail. If user 114 desires to download one or more messages (step 412) then the messages are retrieved as appropriate (step 414). In an exemplary embodiment, offered e-mails may also be selected for upload.

User 114 may be prompted (for example by an application running on network server unit 302 or via the e-mail message described above) that if user 114 is willing to wait for a certain number of minutes until a batch process can be initiated, the cost may be reduced. Furthermore, if a user insists upon establishing an immediate connection, server 302 may use the opportunity to transfer any other messages and/or headers that may be awaiting delivery while the connection is opened. In other embodiments, messages are retrieved immediately (step 414)(such as via a SDU or NATS connection). User 114 is billed as appropriate (step 416).

Of course other techniques for obtaining mail from mail server 202 to user 114 can be formulated, all within the ambit of the present invention. For example, various embodiments of the inventor include data encryption and/or compression for information transferred between ground server 106 and vehicle server 110. Furthermore, after retrieving one or more messages, the process can alternatively repeat by returning to step 408. In addition, user 114 can, in some embodiments, reply to an e-mail in a process similar to the process described below for sending an originally composed e-mail.

Figure 5:
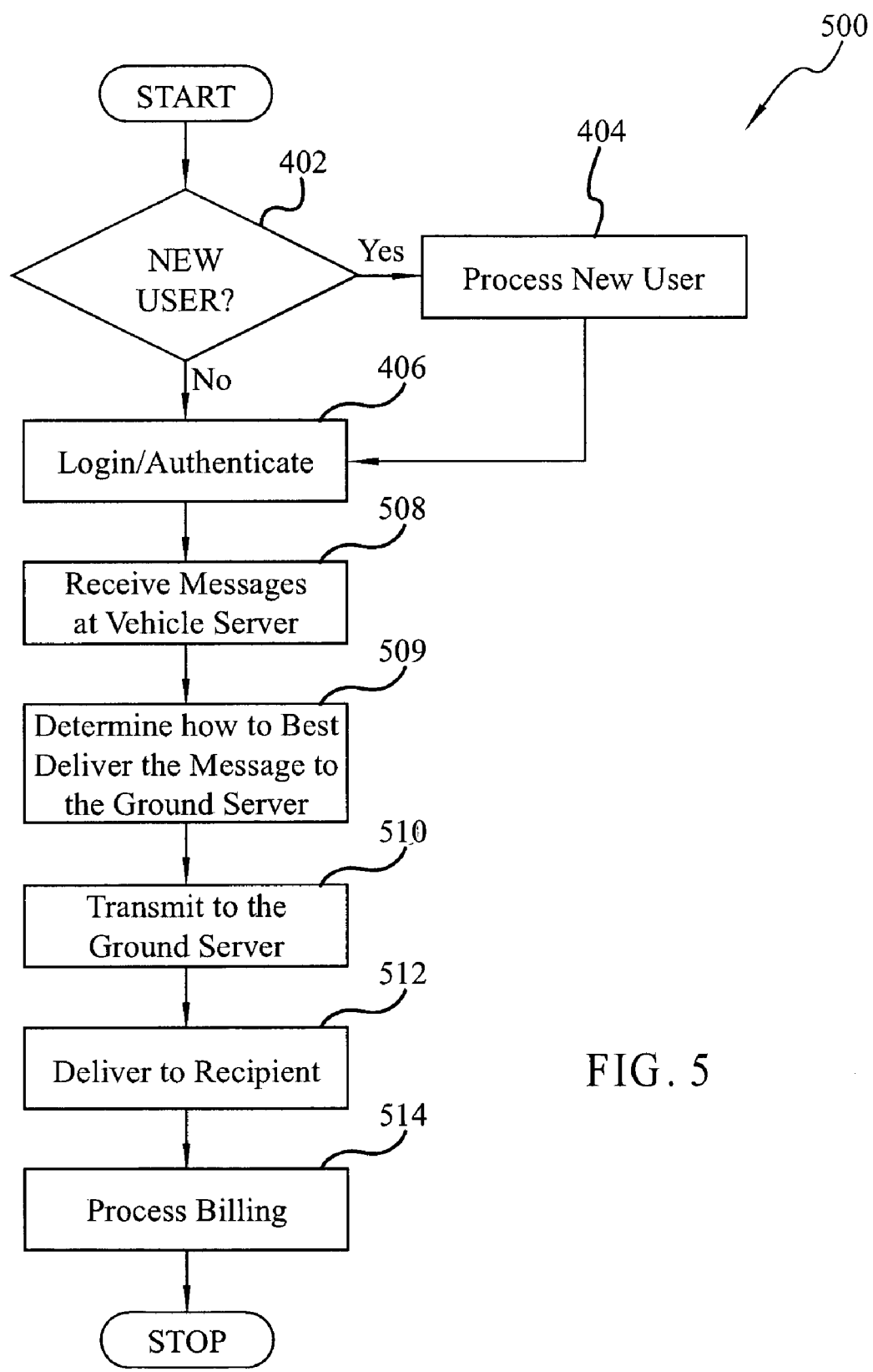
FIG. 5 is a flowchart of an exemplary process for sending e-mails.

FIG. 5 is a flowchart of an exemplary process 500 for sending an e-mail. With reference now to FIG. 5, an exemplary process 500 suitably includes authenticating user 114 as an approved and valid user of system 100, as described above in connection with FIG. 4. New users may also be processed as described above (steps 402, 404, 406). To send a message, user 114 first establishes a connection with network server 302 as described above. In various embodiments, authentication and connection establishing steps may be skipped if user has already signed on and established a connection during this session.

User 114 may suitably compose one or more e-mail messages to be sent, and/or reply to e-mail messages received. The mail client application used by user 114 suitably provides one or more messages to be sent to the network server unit 302 (step 508). The network server unit may then select an appropriate communication mode and an appropriate time to transmit the message(step 509), and transmit the message to the ground server 106 (step 510). For example, network server unit 302 may place the message into a storage queue, and may process the message as part of a batch operation after a certain number of data bytes have been collected or a certain amount of time has past. Alternatively, if the message is determined to be of high priority (for example indicated as such by the user) network server unit 302 may open a direct connection to ground server 106 via, for example, an SDU or NATS connection. Ground server 106 may deliver the message to the intended recipient as appropriate (step 512). Billing for the "send" transaction (step 514) may reflect the type of connection and the urgency of the delivery requested by the user. User 114 may switch between sending and receiving modes without going through the login/authentication steps 406 more than once per session.

In an alternative embodiment, e-mail system 100 establishes a temporary home e-mail account for receiving responses to e-mail sent during that trip. In other embodiments, attachments may also be sent and received by e-mail system 100. In one embodiment, user 114 is prompted to chose between receiving an e-mail with or without its corresponding attachment. In an e-mail client applications, for example, an e-mail offering without attachments is provided as well as an e-mail offering with attachments. User 114 can indicate which viewing is desired by replying to the appropriate e-mail. Furthermore, various billing schemes may be formulated without departing from the scope of the invention. Users of the system may be billed according to any basis, such as: (1) a flat fee per day/week/month/year; (2) a flat fee per message; (3) a flat fee per byte, word or other measure of data transferred; (4) according to the time of actual connection; (5) according to the type of connections established; or (6) according to any combination of the above schemes, or any other scheme.

The corresponding structures, materials, acts and equivalents of all elements in the claims below are intended to include any structure, material or acts for performing the functions in combination with other claimed elements as specifically claimed. The scope of the invention should be determined by the appended claims and their legal equivalence, rather than by the examples given above.

What is claimed is:

1. An e-mail system for use by a plurality of passengers in a vehicle to exchange messages with a second server located external to the vehicle and associated with a data network, each passenger having access to a terminal, the e-mail system comprising:

a first server located on said vehicle, wherein said first server is configured to transport e-mail between said first server and said terminal; and a communications system configured to combine e-mail from the plurality of passengers into a storage queue and to transfer e-mail in the storage queue across a plurality of wireless connections to thereby wirelessly transfer e-mail between said first server and said second server while the vehicle is in motion, wherein the plurality of wireless connections comprises an immediate mode having a first cost associated with an allocated block of data and a batch transfer mode having a second cost that is lower than the first cost, and wherein the communications system is further configured to transfer messages having a high priority with the immediate mode, and to transfer messages having a lower priority with the immediate mode if excess bandwidth exists in the allocated block of data acquired for high priority messages, and to otherwise transfer messages having a lower priority with the batch transfer mode to thereby minimize the overall cost of operating the communications system.

2. The e-mail system of claim 1 wherein: said communications system is configured to deliver an e-mail offer to said terminal; and said communications system is configured to selectively transfer e-mail messages to said first server based upon requests from one of said passengers in response to said e-mail offer.

3. The e-mail system of claim 2 wherein said e-mail offer comprises a subject header identifying an e-mail available for upload, an indication of who sent said e-mail, and a price for delivering said e-mail to said terminal.

4. The e-mail system of claim 2 wherein said terminal comprises a kiosk.

5. The e-mail system of claim 2 wherein said terminal comprises a laptop computer.

6. The e-mail system of claim 2 wherein said terminal comprises a keyboard.

7. The e-mail system of claim 2 wherein said terminal comprises a personal digital assistant.

8. The e-mail system of claim 2 wherein said second server is further configured to provide e-mail accounts for said users.

9. The e-mail system of claim 2 wherein said vehicle is an airplane.

10. The e-mail system of claim 1 where: in said terminal is a laptop computer configured with information identifying a home e-mail sewer; said communications system is further configured to route e-mail to and from said laptop computer through said first server regardless of said laptop computer configuration; and said first server emulates said home e-mail server.

11. The e-mail system of claim 10 wherein said second server is configured to periodically poll said home e-mail server for inbox messages.

12. The e-mail system of claim 10 wherein said second server is configured to receive e-mail forwarded from said home e-mail server.

13. The e-mail system of claim 10 wherein: said communications system is configured to deliver an e-mail offer to said terminal; and said communications system is configured to selectively transfer e-mail messages to said first server based upon requests from said passenger in response to said e-mail offer.

14. The e-mail system of claim 1 wherein:
said communications system is further configured to select one of a plurality of wireless communication modes based on mode selection criteria.

15. The e-mail system of claim 14 wherein said mode selection criteria comprises an increase in data throughput.

16. The e-mail system of claim 14 wherein said mode selection criteria comprises a transmission cost associated with said wireless communication mode.

17. The e-mail system of claim 14 wherein said mode selection criteria comprises an amount a user is willing to pay.

18. The e-mail system of claim 14 wherein said mode selection criteria comprises a time since a last transfer of data.

19. The e-mail system of claim 14 wherein said communication system is configured to transfer compressed data.

20. The e-mail system of claim 14 wherein said communication system is configured to transfer encrypted data.

21. The e-mail system of claim 1 further comprising a vehicle data network configured to transport an e-mail message between said terminal and said first server.

22. The e-mail system of claim 21 where in said vehicle data network comprises a world wide web server.

23. The e-mail system of claim 21 where in said vehicle data network comprises an e-mail server emulating an e-mail server identified by said passenger.

24. The e-mail system of claim 1 wherein said terminal communicates with said first server via a modem interface unit.

25. The e-mail system of claim 1 wherein said terminal communicates with said first server via an in-flight entertainment system.

26. The e-mail system of claim 1 wherein said terminal communicates with said first server via a wireless interface unit.

27. A method of transporting a plurality of e-mail messages between a server on a data network and a plurality of terminals on a vehicle, the method comprising the steps of:
receiving each of the plurality of messages from the plurality of terminals in a storage queue on said vehicle;
determining a priority of each of the plurality of messages;
selecting a wireless transmission mode for each of the plurality of messages from a batch mode having a first cost and an intermediate mode having a second cost for an allocated block of data that is greater than the first cost, wherein the wireless transmission mode is selected to be the immediate mode if the message is an urgent message or if excess bandwidth exists in the allocated block of data, and otherwise selecting the batch mode to thereby minimize the overall cost of transporting the plurality of messages stored in the storage queue; and
transporting each of the plurality of messages between said storage queue and said server using each of the selected transmission modes to thereby minimize the overall cost of transporting the plurality of messages stored in the storage queue.

28. The method of claim 27 wherein said selecting step further comprises determining the selected one of the plurality of communications modes based upon mode selection criteria.

29. The method of claim 27 wherein said selection mode criteria comprises increasing data throughput.

30. The method of claim 28 wherein said selection criteria is an amount of data accumulated in the queue.

31. The method of claim 28 wherein said selection criteria is a cost of said wireless communication mode.

32. The method of claim 28 wherein said selection criteria is an amount said user is willing to pay.

33. The method of claim 28 wherein said selection criteria is a time since last communication.

34. The method of claim 28 wherein said establishing step further comprises the step of determining when to initiate said communication mode.

35. The method of claim 28 wherein said message is compressed.

36. The method of claim 28 wherein said message is encrypted.

37. A digital storage medium having computer-executable instructions stored thereon, wherein said computer-executable instructions are operable to execute the method of claim 28.

38. The method of claim 27 wherein said step of transporting e-mail between said second server and a data network further comprises an e-mail retrieval step wherein an e-mail message is transmitted to said second server.

39. The method of claim 38 wherein said e-mail retrieval step further comprises the step of polling a home e-mail server by said second server and retrieving said e-mail message from said home e-mail service.

40. The method of claim 38 wherein said e-mail retrieval step further comprises said second server receiving e-mail forwarded from a home e-mail server.

41. The method of claim 38 further comprising the step of establishing an e-mail account for said user.

42. The method of claim 41 further comprising the step of receiving an e-mail message sent to said e-mail account.

43. The method of claim 38 wherein said step of transporting e-mail between said second server and said first server further comprises: the step of providing an e-mail offer to said terminal; the step of receiving a request to upload a selected e-mail message; and the step of providing said requested e-mail message to said terminal.

44. The method of claim 43 wherein said step of providing said e-mail offer further comprises the step of providing a subject header identifying an e-mail available for upload, an indication of who sent said e-mail, and a price for delivering said e-mail to said terminal.

45. A digital storage medium having computer-executable instructions stored thereon, wherein said computer-executable instructions are operable to execute the method of claim 43.

46. The method of claim 27 further comprising the steps of:

said first server receiving information identifying a home e-mail server from said terminal, wherein said terminal is a laptop computer;

directing said laptop to said first server regardless of said identifying information; and said first server emulating said home e-mail server.

47. The method of claim 27 wherein said step of transporting a message between said terminal and said first server further comprises transporting said message via a vehicle data network comprising a world wide web server.

48. The method of claim 27 wherein said step of transporting a message between said terminal and said first server further comprises transporting said message via a vehicle data network comprising an e-mail server emulating an e-mail server identified by said terminal.

49. The method of claim 27 further comprising the step of communicating between said terminal and said first server via at least one of the following: a modem interface unit, an in-flight entertainment system, a wireless interface unit; and a kiosk.

50. A digital storage medium having computer-executable instructions stored thereon, wherein said computer-executable instructions are operable to execute the method of claim 27.

51. A method of minimizing the overall cost of transferring a plurality of messages between an airborne saver and a terrestrial server, the method comprising the steps of:

combining at least a portion of the plurality of messages from a plurality of customers into a storage queue;

selecting one of a plurality of operating modes for transferring each of the plurality of messages in the storage queue based at least in part upon a priority of the message, wherein the plurality of operating modes comprise an immediate mode having a first cost associated with an allocated block of data and a batch transfer mode having a second cost that is lower than the first cost, wherein the selecting step comprises assigning messages having a high priority to the immediate mode and assigning lower priority messages to the immediate mode if excess bandwidth exists in the allocated block of data, and otherwise assigning lower priority messages to the batch transfer mode; and transferring the messages in the queue using each of the plurality of operating modes.

52. The method of claim 51 further comprising the step of charging a fee to the user for transferring the email message, wherein the fee for using the immediate mode is greater than the fee for using the batch mode.

53. The method of claim 51 wherein the selecting step further comprises considering user criteria in selecting the one of the plurality of operating modes.

54. The method of claim 53 wherein the user criteria comprises a cost of sending the message.

* * * * *

UNITED STATES PATENT AND TRADEMARK OFFICE
CERTIFICATE OF CORRECTION

PATENT NO. : 7,035,634 B2  Page 1 of 1
APPLICATION NO. : 09/829887
DATED : April 25, 2006
INVENTOR(S) : Stephen E. Mead et al.

It is certified that error appears in the above-identified patent and that said Letters Patent is hereby corrected as shown below:

Claim 51, Column 14, Line 2, delete "saver" and insert --server--

Signed and Sealed this

Second Day of October, 2007

JON W. DUDAS
*Director of the United States Patent and Trademark Office*